(12) United States Patent
Doebele et al.

(10) Patent No.: US 8,200,402 B2
(45) Date of Patent: Jun. 12, 2012

(54) METHOD FOR CARRYING OUT A SHIFT OF GEARS OF AN AUTOMATIC TRANSMISSION

(75) Inventors: Bernd Doebele, Salem (DE); Norbert Wiencek, Hagnau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 464 days.

(21) Appl. No.: 12/447,177

(22) PCT Filed: Nov. 5, 2007

(86) PCT No.: PCT/EP2007/061848
§ 371 (c)(1),
(2), (4) Date: Apr. 24, 2009

(87) PCT Pub. No.: WO2008/058860
PCT Pub. Date: May 22, 2008

(65) Prior Publication Data
US 2010/0042299 A1 Feb. 18, 2010

(30) Foreign Application Priority Data
Nov. 17, 2006 (DE) .......................... 10 2006 054 277

(51) Int. Cl.
*G06F 7/00* (2006.01)
(52) U.S. Cl. ................. 701/51; 701/55; 701/61; 701/67
(58) Field of Classification Search ..................... 701/51, 701/55, 61, 67
See application file for complete search history.

(56) References Cited

U.S. PATENT DOCUMENTS

| 5,899,829 | A  | * | 5/1999 | Salecker et al. | 477/78 |
| 6,507,780 | B2 | * | 1/2003 | Graf | 701/51 |
| 6,770,010 | B2 |   | 8/2004 | Matsumura et al. | |
| 6,881,171 | B2 | * | 4/2005 | Kuhstrebe et al. | 477/78 |
| 7,344,474 | B2 |   | 3/2008 | Stasik et al. | |
| 7,662,063 | B2 | * | 2/2010 | Schnitzer | 477/70 |
| 2001/0011484 | A1 |   | 8/2001 | Ruhle et al. | |
| 2006/0211536 | A1 | * | 9/2006 | Guggolz et al. | 477/34 |

FOREIGN PATENT DOCUMENTS

| DE | 199 04 129 C1 | 2/2000 |
| DE | 102 49 951 A1 | 5/2004 |
| DE | 103 61 299 A1 | 7/2005 |
| EP | 0 427 000 A2 | 5/1991 |
| EP | 1 316 463 A2 | 6/2003 |
| WO | 02/060715 A1 | 8/2002 |
| WO | 2004/037590 A1 | 5/2004 |
| WO | 2006/053670 A1 | 5/2006 |

\* cited by examiner

*Primary Examiner* — Mary Cheung
*Assistant Examiner* — Daniel L Greene
(74) *Attorney, Agent, or Firm* — Davis & Bujold, P.L.L.C.

(57) ABSTRACT

A method for shifting gears of an automatic transmission of a vehicle, by way of primarily form-locking shifting elements, while driving with or without utilization of a clutch depending on a decision made by a decision device which, in the presence of certain basic conditions, causes disengagement of a starting gear without disengaging the clutch, and subsequently reads in data about the size and the progression of a quantity correlating closely with the rotational speed of an output shaft of the automatic transmission and, with inclusion of this data, determines the shifting mode for engagement of the target gear.

6 Claims, 1 Drawing Sheet

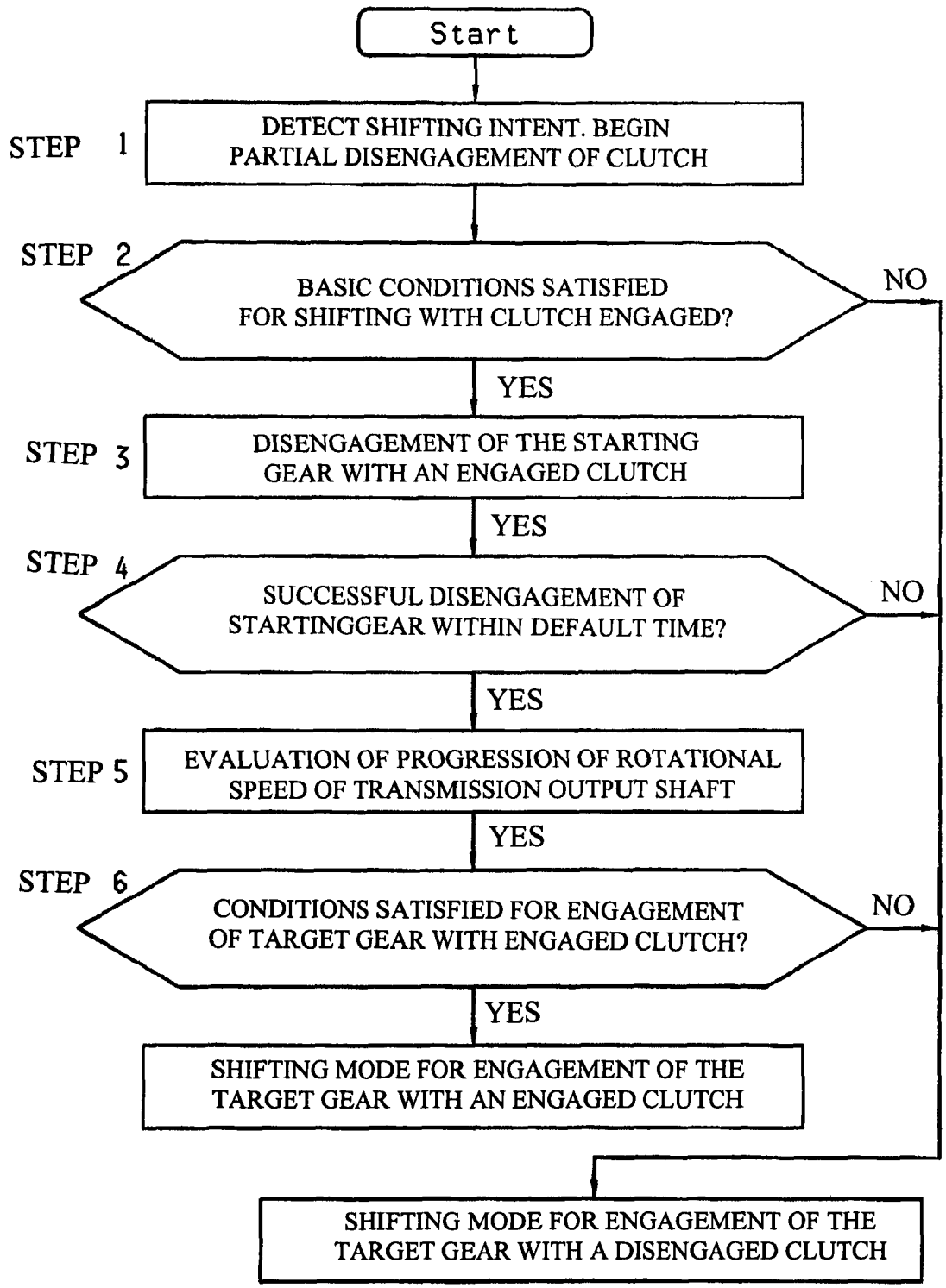

METHOD FOR CARRYING OUT A SHIFT OF GEARS OF AN AUTOMATIC TRANSMISSION

This application is a National Stage completion of PCT/EP2007/061848 filed Nov. 5, 2007, which claims priority from German patent application serial no. 10 2006 054 277.0 filed Nov. 17, 2006.

FIELD OF THE INVENTION

The invention relates to a method for performing a gear shift of an automatic transmission of a vehicle while driving, with or without utilization of a clutch.

BACKGROUND OF THE INVENTION

Automatic transmissions have been used for some time in different types of motor vehicles. They have a plurality of fixed transmission ratios which can be selected by means of the driver's input and/or by a transmission control device located in the flow of torque between a drive engine and the driven wheels of a vehicle. Between the drive engine of the vehicle and the automatic transmission there is a clutch or driving clutch which allows engagement of a driving gear with the drive engine running and the vehicle stopped. This clutch is often also automatically actuated and thus allows fully automatic or semi-automatic shifting processes.

Automatic transmissions can be designed as synchronized transmissions. In this design, certain transmission elements ensure that, when engaging a gear, the involved, cooperating, form-locking elements of the transmission will move without any, or only a little, desired speed difference. Synchronization is ensured in this design by means of friction couplings within the transmission.

Because of a plurality of different friction pairings for different transmission steps of the transmission placement of a synchronization device in the transmission is associated with fundamental disadvantages related to the costs involved with the additional elements, the needed additional installation space, the greater weight due to the additional elements, and not lastly with regard to the possible maintenance-free life of the transmission. Since friction clutches are subject to significant wear, they have to be replaced after a particular service life, at least in vehicles with high operating power or frequent shifting, and this results in significant expense, due their location in the transmission, and loss of the vehicle during its repair in the workshop.

In particular, with vehicle types which typically have commercial uses and high annual mileage and/or a particularly large number of shift processes, unsynchronized transmissions offer certain advantages. These transmissions are usually designed as "claw" transmissions in which the transmission stage located in the flow of torque between the drive engine and driven wheels is specified by a movement of a form-locked element. Usually in this type of transmission, the gear wheels are secured to a shaft in a non-rotating manner, whereas gear wheels engaging with them are at least seated on and axially fixed to a different shaft as so-called loose wheels, but can rotate radially on the shaft as loose wheels. These loose wheels can be fixed in position on their shaft by means of selector fingers or pawls, so that a flow of torque is possible from a fixed wheel arranged on a first shaft, to a loose wheel secured to a second shaft by a selector pawl.

Shifting of the selector pawls is only possible with reasonable strain on the component and with little or no generation of noise when the loose wheel, secured to its shaft, and the associated shaft in general have roughly the same rotational speed. Since the rotational speed of the transmission output shaft is determined by the cruising speed of the vehicle and by the generally fixed transmission ratios between the driven wheels and the transmission input shaft, the rotational speed of the transmission drive shaft must be adjusted for a gear shift of an unsynchronized transmission in a moving vehicle, so that it at least roughly corresponds to the rotational speed which results after engagement of the claw coupling.

In this regard, the drive engine can be controlled primarily in a simple manner with a transmission in the neutral position and the clutch disengaged, or the engine rotational speed can be controlled so that the drive engine can be set to a higher or lower rotational speed than that needed for synchronization of the transmission, according to the desired acceleration or deceleration of the transmission input shaft. Now if the clutch is slowly engaged, the drive shaft of the transmission will be accelerated or decelerated accordingly. As soon as the deviation from the desired synchronous rotational speed is sufficiently small, the form-locking elements engage, in order to hold the loose wheels, and the desired gear is selected.

This method has the advantage that it will operate problem-free, due to the large potential slippage in the clutch, even with very large differences in rotational speed between the output rotational speed of the drive engine and the actual or desired rotational speed of the transmission drive shaft.

In the case of frequent shifting and with large-weight vehicles, however, the resultant wear on the clutch is significant and, in turn, results in expenses for replacement of the friction linings and also in vehicle down times resulting from the time spent in the workshop. Furthermore, in addition to the friction linings of the clutch the associated actuators and release bearing are placed under stress and subject to wear.

With this as background, there are already some designs for shifting an unsynchronized transmission during vehicle travel with the clutch engaged. In this case it is necessary—at the rotational speed of the transmission output shaft defined by the vehicle's cruising speed—to relatively accurately adjust the rotational speed of the transmission drive shaft and/or of the output shaft of the drive engine connected to and rotating with the output drive shaft via the engaged clutch, to the rotational speed necessary for the synchronization.

Provided this synchronization occurs by means of engine rotational speed within a reasonable time, this requires comparatively complicated and precise engine control. The adjusted rotational speed in this case is initially dependent on the power applied by the drive engine to the pistons, and this power is, in turn, dependent on such numerous factors as the amount of fuel injected, the fuel-air ratio, the ignition angle and also on individually different engine properties within an engine series, and on other factors as well.

For a determination of the engine power that is available for propulsion of the input shaft of the transmission, the engine power applied to the pistons has to be reduced, for example, by internal friction losses, which in turn are dependent not only on the particular amount of wear on the components of the drive engine and the transmission, but also change in the short term, for example, with the temperature and viscosity of the transmission- and engine oil.

Furthermore, it must be taken into account that adjustment of the synchronization speed takes place with the gear disengaged, that is, in the neutral position of the transmission. Owing to the very steep progression of a power-rotational speed curve in this operating state of the drive engine, even small changes in input power or in drag torques counteracting the drive power result in considerable differences in rotational speed, so that, for example, a change in the power consumption of a generator or of an air conditioning system can have short-term, tangible effects on the progression of adjusting the rotational speed. This control range of the drive engine is nonetheless satisfactorily mastered by an engine control in many cases.

Furthermore, adjusting a synchronous rotational speed involves a highly dynamic process in which the mass inertia of the masses to be accelerated or decelerated likewise plays a significant role. Whereas the masses to be accelerated or decelerated are known rather accurately and in general change very slowly, for example, with increasing wear on the clutch linings, it must further be taken into account that the synchronization rotational speed during the shifting process can likewise change on the transmission input side. As soon as the traction power of the engine can no longer be transferred to the driven wheels because the gear, previously engaged in the transmission, is disengaged and the transmission is thus in the neutral position, the speed of the vehicle changes according to the applied forces which depends on the inclination of the surface on which the vehicle is located, the vehicle weight, roll resistance caused by vehicle components and road surface roughness, air resistance, and the speed and direction of incident air as well as other factors. These factors are of course not within the ability of the engine control to ameliorate and must therefore be detected separately and passed to the engine control as a synchronous rotational speed needed at present or in the future.

For the decision whether a gear shift should be performed without disengaging the clutch and for sufficiently accurately setting a synchronous rotational speed, the interplay of these and other factors has to ultimately be estimated. It must be taken into account that the advantages attainable by a shifting process without disengaging of the clutch are largely based on a reduction in the wear.

Of course, it is sufficient in the simplest case to determine the desired synchronous rotational speed of the transmission input shaft by the rather easily measured rotational speed of the transmission output shaft and the translation known by the target gear, and also to influence the output shaft of the drive engine in the desired direction by means of a control loop. But a procedure of this kind often leads to disproportionately long shift times or an undesirable, imprecisely adjusted synchronous rotational speed during highly fluctuating vehicle operating conditions.

Finally, it should be noted that there are shifting processes which cannot be, or, in any event, cannot advantageously be implemented without disengaging the clutch. Among these are not only start up processes, but also shift processes which would require, for example, a rotational speed of the drive engine below the normal idle rotational speed or even below the possible idle rotational speed. A shifting process of this kind can be desirable, for instance, when a vehicle is moving downhill and the driver wants only a very small effect of the engine brake or in anticipation of an acceleration of the vehicle on steep inclines, when the driver wants to select a gear that will briefly cause engine operation at or below the lower rotational speed limit, but will be at an appropriate driving gear within a few seconds based on vehicle acceleration.

From DE 102 49 951 A1 a method to control a drive train is already known in which a gear shift is made possible by taking into account a plurality of different factors, but without disengaging the clutch. In this regard, for each gear shift a decision is made, whether the gear shift is to be performed with clutch engaged or disengaged. Provided that an analysis shows a gear shift is possible with the clutch engaged, the gear shift will also be carried out with the clutch engaged.

It is proposed in this regard to select and/or analyze the mode of gear shift based on a plurality of vehicle parameters and operating characteristics. It should be stressed that the danger that the selection of the mode of gear shift will result in a wrong result is particularly low with this method. On the one hand, this is due to an extremely complicated process sequence, both with respect to the needed computational power of an electronic transmission control unit, and also due to the needed sensors, and, on the other hand, because a gear shift with an engaged clutch can only be carried out when the determination method will predict a smooth shift with a high degree of reliability.

For example, according to one basic variant of the method disclosed in DE 102 49 951 A1, shifting with the clutch engaged is not used when one of the involved components or its sensors happens to be malfunctioning. Due to the mentioned large number of factors and components to be taken into account, this means in practice a significant reduction in the average availability of the system. Furthermore, after the initial start of the vehicle and after a restart, very restrictive rules are set for allowing a shift process with the clutch engaged, in order thus to compensate for the uncertainty regarding as yet insufficiently known current and critical influence parameters.

The security against a wrongly permitted shifting process with an engaged clutch is greatly increased, when even small uncertainties are detected with regard to the feasibility, the system is switched to a shifting mode with disengaged clutch. The advantages of shifting with the clutch engaged can thus not be realized in many cases in which they would be useful in practice, for reasons considered in this known procedure. It is thereby important that the decision about the mode of gear shifting (with an engaged clutch or a disengaged clutch) is always made before initiation of the shift procedure.

Accordingly, the envisioned procedure is not able, at least in some cases, to guarantee the claimed certainty of the shift mode decision. To be considered thereby is the daily major change of loading in commercial vehicles and thus the overall vehicle weight, such that after restarting the drive motor a shift with an engaged clutch can be omitted until the basic influence factors, like, for example, the overall vehicle weight, can be determined to a sufficiently accurate extent or can be estimated. Now, however, shutting off the drive motor is not urgently necessary for a basic change of load and is more the exception than the rule with, for example, construction site vehicles like dump trucks and cement mixers, certain tanker vehicles, but also with passenger vehicles, like school and tour buses.

In order to eliminate at least in part the described disadvantages shown in DE 102 49 951 A1, an improvement of this process is, as proposed in the invention, to less stringently formulate the requirements for enabling a shift procedure with an engaged clutch and thereby, with a decision made for a gear change with an engaged clutch, to also consider the partial step of disengaging the previously engaged gear to check the appropriateness of the decision.

In fact it is assumed that, if a wrong decision is made about the mode of gear shifting, the transmission cannot be placed into an essentially torque-free state, so that disengagement of the engaged gear is possible at low shifting force within a default period of time.

Thus in the event of a decision made for a gear shift with an engaged clutch, a time limitation is introduced for disengagement of the engaged gear, and, if this time is exceeded, it is assumed that the necessary prerequisites for the process of engagement of the target gear with an engaged clutch have not been satisfied. In this case, the shifting process will be terminated and will begin anew in a shifting mode with a disengaged clutch, or the system will switch to this mode.

Thus the additional advantage of this improvement to the known method is that a shifting process already initiated can still be terminated at a relatively late point in time. It should be recalled, however, that the requirements of accuracy of the engine control for the disengagement of a gear are much looser than for the successful engagement of a gear. Successful disengagement of a gear thus cannot be judged as a dependable sign that the subsequent engagement of a gear with an engaged clutch will be successful or desirable.

Furthermore, the requirements for a shifting process with an engaged clutch differ from gear to gear, and, for example, as a function of the driving speed and of the loading and other operating parameters of the motor vehicle and on its environment. This is to be taken into account according to DE 102 49 951 A1, in that the threshold time until termination of the attempted gear shift with an engaged clutch is varied depending on parameters of this type, which in turn increases the complexity of the method and thus either increases its susceptibility to wrong decisions or considerably increases the needed safety margin to ensure a still advantageously implemented shifting process with an engaged clutch.

SUMMARY OF THE INVENTION

With this as background, the object of the invention is designing a method for performing a gear shift of an automatic transmission of a motor vehicle, when driving with or without utilization of a clutch, which offers a higher reliability with reduced expense in comparison to the known method and which can also make reliable predictions about the usefulness of a gear shift with an engaged clutch—hereinafter called briefly clutchless shifting—even after a change in vehicle weight and with the drive engine running.

The invention is based on the knowledge that the reliability of a decision made about the advantage of clutchless shifting can be improved when the decision about the shifting mode—that is, a clutchless engagement of a gear or engagement of a gear with a disengaged clutch—is made at a later point in time of the shifting process. In particular, the invention is based on the knowledge that the decision-relevant overall effect of a plurality of factors—difficult to measure based on the prior art—can be determined by simple means and with increased reliability, as soon as the automatic transmission is in its neutral position with a disengaged gear.

Ultimately, the decision about the shifting mode to be used, that is, about clutchless shifting or gear engagement or disengaged clutch shifting or gear engagement, is not based on the magnitude of the individual, named factors, but rather on the effects on the rotational speed essential to shifting which arise from the sum of factors, that is, in particular the rotational speeds of the transmission elements to be coupled so as to rotate together by a form-locked connection.

After disengagement of the previously engaged gear, by simple sensing of the rotational speed of the transmission output shaft—or of a parameter in a sufficiently fixed relationship thereto, such as the driving speed or a rotational speed of another transmission element force-coupled thereto—and of the time change of this rotational speed, it can be determined precisely, reliably and at low cost whether and how the vehicle's driving speed and thus the synchronous rotational speed will change.

It is thus not necessary—as proposed in the prior art—to determine in particular the load, the incline, the road roughness and other changing parameters, which are difficult to measure or which can only be measured at considerable expense, and then to combine them into one overall, unreliable value determined at considerable computational expense. In addition, due to the direct determination of the rotational speed and of the temporal change in rotational speed of the transmission output shaft, it is possible relatively easily and accurately to predict their future progression within a time span needed for the shifting process.

Accordingly, the invention proceeds from a selection method to perform a gear shift of an automatic transmission of a motor vehicle when driving with or without utilization of a clutch, wherein the drive train of the vehicle has a drive machine, an automatic transmission with several fixed transmission ratios, an automatic shifting clutch located between the drive machine and the automatic transmission, and a shift control device which controls changes in the transmission ratio according to driver inputs and/or according to an automatic gear selector device.

In this regard, the shift control device can be designed either as a stand-alone apparatus or even as part of another control apparatus, or even can be functionally designed as part of several control devices connected together by data transmission technology, so that it can carry out or implement a change in the transmission ratio of the automatic transmission with or without disengagement of the clutch after the decision of a decision device—which can be an integral constituent of the shift control device, a stand-alone apparatus or a part of another control apparatus which is connected to the shift control device by data engineering.

To solve this particular problem, the invention provides that the decision device, in the presence of certain basic conditions, causes disengagement of a starting gear without disengaging the clutch and subsequently reads in data about the size and the progression of a value closely correlated with the rotational speed of an output shaft of the automatic transmission and determines the shifting mode for the engagement of the target gear at least with inclusion of this data.

The mentioned definite, basic conditions require a more precise explanation here: They are to be understood such that the data actually present in the concrete embodiment are evaluated in whole or in part to determine whether the implementation of the shifting process appears feasible with an engaged clutch, basically at a probability to be estimated or determined by a technician with ordinary skill in the art.

This is to be understood such that in those cases where the successful implementation of a gear shift with closed clutch is precluded in advance at a sufficiently high probability, an opening of the clutch will be preferred at an earlier point in time and an otherwise necessary check of the rotational speed and of the speed change of the transmission output shaft in this case can preferably be omitted, but could also be carried out based on other evaluation criteria, if necessary. The mentioned sufficiently high probability in turn is to be established in an individual case by a person having ordinary skill according to the transmission or drive train factors.

It basically will not be desirable to begin the shifting process first with an engaged clutch, for example, in those cases in which—proceeding from the instantaneous rotational speed of the transmission input shaft (or e.g. from the driving speed in combination with the known translation of the starting gear) on the one hand, and the known target gear on the other hand—it seems certain, that the drive engine cannot reach the rotational speed needed for a clutchless shifting process or cannot attain it within a desired period of time, or only under undesirable accompanying phenomena.

In any event, it can only be determined precisely in the specific, actual case where the lower rotational speed limit of the drive engine should be. Also, it depends on the individual case and/or on the drive train, whether a constant rotational speed limit should be taken into account or whether the decision device has access to additional relevant information, such as the engine oil temperature, the instantaneous electrical power consumption of the system, or the operation of an air-conditioning unit. In these cases it would be useful to specify the lower rotational speed limit under consideration of these or other, or, as the case may be, additional parameters on a dynamic basis.

On the other hand, the specialist with knowledge of the invention can also decide based on restrictions related to available program memory or the data processing capacity of the decision device that he intends to dispense with, in whole or in part, an analysis of the basic conditions in the actual embodiment. In an extreme case, the definite, basic conditions for the decision device to disengage the starting gear without disengaging the clutch could thus also exist only after an analysis of whether the vehicle is stationary or whether at the time of shift intent, a gear is engaged and the clutch is engaged.

It is essential to the inventive method that the decision device, at least where it has initiated disengagement of a starting gear without disengaging the clutch, subsequently reads in data about the size and the progression of a quantity closely correlating with the rotational speed of an output shaft of the automatic transmission, and at least with inclusion of this data determines the shifting mode for the engagement of the target gear.

Now the data about the size and the progression of a value closely correlating with the rotational speed of an output shaft of the automatic transmission, as mentioned, can be the rotational speed of a vehicle wheel, the driving speed of the vehicle or the rotational speed of another rotating part whose speed ratio is related to the rotational speed of the transmission input shaft in a manner sufficiently well-known for the present purpose.

From this key value and its progression over time, one can predict by simple and low-cost means what synchronous rotational speed of the input shaft of the automatic transmission is needed or desired and what deviation from the rotational speed is tolerable or even welcome here.

Of course it is possible to include any other data, such as those vehicle parameters and operating quantities named in DE 102 49 951 A1, in the decision, provided this seems useful based on a cost-benefit analysis and, in particular, when this data is inherently available over a vehicle data bus.

Based on this data or at least with inclusion of this data, the decision device decides on the shifting mode for engagement of the target gear. The decision about the particular, suitable shifting mode thus occurs at a later time in the shifting process in comparison to the prior art, and in a surprisingly simple manner makes it possible to determine and to evaluate accurately by very simple means, the sum of many single parameters which are relevant to the decision and which were difficult and complicated to determine in the prior art.

The quality of this decision, even when simple decision models are used, is clearly greater than that of the method according to DE 102 49 951 A1, since the latter operates with the repeatedly determined active chains. This will be illustrated below by means of one example:

In the prior art, the data concerning the slope of a road surface and the direction of movement of the vehicle are read out from a digitized road map by means of determined GPS position data, and then the slope resistance is determined by incorporation of an estimated or measured vehicle weight, and this resistance is increased, if necessary, by the vehicle rolling resistance determined likewise as a function of the vehicle weight and the speed-related air resistance, and yet still the influence of any prevailing tail wind and of any wrongly adjusted tire pressure is neglected. But the method according to the invention operates by separating the drive machine from the driven wheels by disengaging the engaged gear with the clutch engaged and shifting the automatic transmission into its neutral position.

Next, the decision device according to the invented method monitors for about two hundred milliseconds or even longer, how the driving speed of the vehicle or how the rotational speed of the transmission shaft changes, for example, over time. It thereby makes no difference at all for this purpose whether a powerful deceleration of the vehicle is attributable to a large load and a significant slope, or to a small load and a strong headwind, and what effect is exerted by the tire pressure and the coefficient of friction of the road surface.

Simply, the knowledge that the vehicle decelerates so quickly, for example, that the engaged target gear with an engaged clutch cannot be engaged in a favorable manner is decisive, because the shifting time would be extended in an undesirable manner due to the necessary, large drop in the rotational speed of the engine output shaft with the engaged clutch, and the shifting process with the disengaged clutch could be completed much faster, e.g., by activating an internal or external brake, which act on the input shaft of the automatic transmission.

Within the scope of the inventive method, it is possible and useful to first process the used input data, especially the rotational speed information from the transmission input shaft. For example, it can be useful to use the data ascertained only a few milliseconds after the successful disengagement of the starting gear, in order to reduce the effects of an elastic deformation caused by a change in the load. Alternatively, effects of this kind can also be corrected by different statistical or mathematic methods.

In one preferred embodiment of the invention, the decision device and the shift control device cooperate with an automatic transmission having fixed translation ratios which uses at least primarily form-locking elements for the shifting of different transmission ratios. These are primarily claw transmissions which have long been known to a person having ordinary skill. Although the inventive method can also be used to advantage, for example, even in positive transmissions synchronized by synchronous rings, since at least with precision synchronization the useful life of the synchronous rings can be extended and in case of failure of the transmission's own synchronization, an external synchronization is possible, the advantages in using positive elements for shifting of the gears are particularly great. That is because in this case, at least given a required acceleration of the transmission input shaft, an external synchronization must occur by increasing the engine rotational speed which can be clearly improved by the invented method with very little expense, both with respect to the wear on the clutch and also with respect to the shifting quality.

According to another variant of the method, the invention provides that the decision device, in the presence of certain basic conditions, causes disengagement of a starting gear without disengaging the clutch and subsequently monitors whether the disengagement of the starting gear takes place within a default time. In the case that a default time is exceeded without the disengagement of the starting gear, a change of the shifting mode results in a shift with disengagement of the clutch.

This kind of control-related safety function, taken by itself, is already known from the prior art, but it has been used only for certain, particular cases, namely after the beginning of a reverse shift. The advantage of monitoring the successful disengagement of the starting gear within the scope of the inventive method is, that it occurs at a significantly different point in the temporal sequence of the method, namely before making the decision about which shifting mode is to be used. Accordingly, this safety function also has a completely different purpose.

While this safety function was used in the prior art after a decision was made for a clutchless shifting process in the event of an improper decision as an emergency strategy to allow continuance of the shifting process or to prevent the transmission controller from waiting indefinitely for gear disengagement, this safety function is used in the inventive method even before making a decision about the mode of gear shifting (as in the method just described), to allow an early decision to be made about the mode of gear shifting with a disengaged clutch.

Even though this safety function also has the subordinate task of preventing or correcting any "hanging" of the process, it also has the purpose here of shortening the process, since a decision about the type of shifting mode used—namely by evaluating the rotational speed progression of the transmission output shaft in the neutral position of the transmission—can be avoided.

Even though the positive effect of this kind of "abbreviation" of the process in a method according to the prior art would be even greater due to the disproportionately greater expense, this refinement to the inventive method still offers the potential of making a useful decision about the shifting mode at an earlier point in time and avoiding superfluous evaluations.

According to another variant of the method, the invention proposes that the shift control device begins, at a time before making a decision on the shifting mode to activate actuators of the clutch in the direction of a disengaged position of the clutch, and that the shift control device carries out this activation before a decision is made about the shifting mode, only to the extent that no slippage of the clutch is involved or that no wear relevant to the friction linings of the clutch is involved. Thus it is possible to begin the displacement motion of the clutch right at, or even before, the initiation of the shifting process. This allows a comparatively slow adjustment of the actuators and thus reduces their wear.

The result of this process is that the clutch, at the time of the decision about the shift mode, will already be partly disengaged or relaxed, in the event that a shift with the disengaged clutch is to occur, so that the subsequent shifting process can be accelerated. It is also possible to disengage the clutch somewhat until the previous gear is disengaged.

In the event that a decision is made in favor of gear engagement with an engaged clutch, the clutch can be directly reset to its engaged, starting position and thus the maximum possible torque is transferred.

Now if the shift control device controls the speed of movement of the clutch actuators as a function of the degree of load reduction, then in the event the load reduction occurs quickly and thus a shift with the clutch engaged is probable, a desirable, slower servo-motion of the clutch will result and, in cases in which the load reduction occurs slowly and thus a shifting process with a disengaged clutch is probable, a relatively fast disengagement or relaxation of the clutch can occur at a later point in time. The following shifting process can thus be carried out very quickly.

The initial control of actuators of the clutch can occur in a favorable manner, even independently of the actual program sequence, and, for example, can be placed into a separate module or into an existing clutch control module. In addition, it is possible to include additional parameters for control of the clutch actuators which likewise are relevant to the subsequent decision to be made about the shifting mode.

Finally, it should be pointed out that the actuated position of the clutch, with the previous gear disengaged and the target gear not yet engaged, that is, in the neutral position of the transmission, is controlled as a function of the sign and/or the absolute value of the difference of the set rotational speed and the actual rotational speed of the transmission input shaft, the level of the transmission input rotational speed in the target gear, the quotient of the gradient of the target rotational speed and the gradient of the rotational speed of the output shaft of the internal combustion engine and/or the driving resistance.

BRIEF DESCRIPTION OF THE DRAWINGS

The invention can be explained additionally based on one design embodiment. Also included is a description of the sole FIGURE showing a highly simplified flow chart of the disclosed method that runs as a program in a combined, electronic transmission and clutch control device.

DETAILED DESCRIPTION OF THE PREFERRED EMBODIMENTS

Starting from a motor vehicle with an internal combustion engine as drive engine, an asynchronous multigear claw transmission and an automatic shifting clutch located between the claw transmission and internal combustion engine, the vehicle moving at a driving speed of 30 km/h (18.6 mph), let us assume that the driver or an automatic shifting input device outputs a signal that the claw transmission is to be shifted from the engaged second gear into third gear.

This servo-command is picked up by the shift control device with an integrated decision device which, subsequently in preliminary step 1, first determines—based on the known driving speed and the starting gear and on the target gear—an approximate synchronous rotational speed to be adjusted by the internal combustion engine and begins slowly to adjust the clutch actuators in the direction of disengaging the clutch.

Then, in the following step 2, which is the core of the process sequence, the decision device checks for the presence of certain basic conditions for a shifting mode to engage the target gear with an engaged clutch. In this example, first a check occurs to determine whether the vehicle is moving and whether at this time a starting gear is engaged. This is affirmed. An additional check is run to determine whether a shift over two or more gears is to occur. This is not the case. If this were the case (output "NO"), then based on the considerable rotational speed difference between the synchronous rotational speed to be adjusted and the instantaneous rotational speed of the internal combustion engine, a shift with an engaged clutch would not be advantageous and the program would immediately make a decision for gear shifting with a disengaged clutch, and the remaining control tasks would be left to the control unit which would drive the clutch actuators at the default adjusting speed used for this mode and would carry out a conventional shifting with disengagement of the clutch. Additional calculations could be left off and the program sequence of the decision device could be ended (branching to the lower action rectangle in the FIGURE). Since in the example described here the fundamental conditions are met (output "YES"), the program skips to step 3.

In step 3, the shifting control device causes a disengagement of the third gear with an engaged clutch according to the usual and well known process, that is, in particular, in the presence of a sufficient, interim load reduction on the drive engine caused for example, by an engine control device.

In addition, it should be noted that this load reduction relates not only to cases in which the drive engine initiates a positive torque in the claw transmission, but rather also to those operating situations in which, for example, the engine brake is used and thus a positive torque is initiated in the internal combustion engine itself. Initially only a small amount of transmitted torque is important, since, if the transmitted torque is too great, disengagement of the gear would not be possible, or at least would not be desirable. These processes are known, however, to the ordinary technician, and need no further explanation here.

Alternatively and likewise in a known manner, an actuator to disengage the engaged third gear with a selected actuation force can be provided, in order to cause gear disengagement as soon as the above-described torque is sufficiently low.

In step 4, the decision device checks whether a specified, constant time has expired or whether a time considered to be reasonable under the given circumstances has expired, without there having occurred a successful disengagement of the third gear. If this should be the case, then this is an unambiguous indication that engagement of the second gear with an engaged clutch cannot be carried out with the desired accuracy and/or within the desired shifting time. In this case, the decision device likewise decides for a shifting process with a disengaged clutch, ends the program sequence by means of the "NO" output, and leaves the shifting control device to control the shifting process with a disengaged clutch (branches to the bottom action rectangle in the FIGURE).

Provided that the third gear can be disengaged with the adjusted actuator force and within the maximum time allotted for this (output "YES"), the program proceeds to step 5.

In this step 5, the decision device monitors the progression of rotational speed of the transmission output shaft, and in this case it will not take into account the first 15 milliseconds, for example, since this time is characterized too greatly by relief-induced rotational movements of the transmission output shaft. In the following 300 milliseconds, for example, or even up until sufficiently predictive data are present, but at a maximum time of 500 ms, for example, to be established in the specific case, the decision device evaluates the progression of this rotational speed of the transmission output shaft.

Now two cases will be examined below relative to decisions made about the shifting mode in step 6:

In the first case, the decision device determines that the vehicle is significantly decelerated. This could be attributable, for example, to a road with a significant incline, a sandy substrate, a powerful headwind with little load, or to other factors. Ultimately, the cause of the deceleration is unimportant here, since the decision device need only determine whether under the given conditions a shift with or without the clutch is advantageous. In this case, an up-shift to a higher gear is pending. Thus the rotational speed applied to the internal combustion engine after engagement of the target gear is anyway much less than the starting rotational speed. Also, this effect is enhanced here in that the translation difference between the second and third gear is relatively large with respect to other gear shifts.

Since, in this example, the rotational speed of the transmission output shaft is simultaneously increasingly decelerated, the decision device recognizes that any adjustment of the internal combustion engine to a synchronous rotational speed in this case would take an undesirably long time. This would cause a competition between the deceleration of the rotational speed of the internal combustion engine and the simultaneous reduction in the needed synchronous rotational speed. The decision device thus outputs a signal to the shifting control device (output "NO") that the shifting process should be carried out with a disengaged clutch, since thus by means of a transmission brake acting on the drive shaft of the transmission, the synchronous rotational speed can be attained much faster.

Alternatively or additionally, the decision can also take into account, in a somewhat more complicated decision method, that the engine rotational speed—when a synchronous rotational speed is reached with an engaged clutch—would predictably be so low, that the needed torque could no longer be produced by the internal combustion engine.

In this case, it turns out that the actuators of the clutch were already actuated up to a certain amount in the direction of disengaging of the clutch and the starting gear was already disengaged. The gear shift can occur nearly as fast as if a shift with an engaged clutch had not been taken into consideration at all from the outset.

In the second case, the decision device comes to the result that the vehicle is only slightly decelerated or is even slightly accelerating, since it is moving on flat and smooth road surface in a moderate tailwind and is also heavily loaded. Here too, the reasons for the vehicle's acceleration behavior are ultimately unimportant. The decision device, however, recognizes, that the rotational speed of the internal combustion engine, in this case with an engaged clutch and without utilization of the transmission brake, which is not designed for such inertial masses, can be easily brought to the likely needed synchronous rotational speed within an acceptable time. In this case, the decision device passes a command (output "YES") to the shifting control device to carry out a shifting process with an engaged clutch which triggers and monitors the following steps. This includes, for example, the initiation of the restoration of the clutch actuators, so that the clutch can transfer the maximum torque with no slippage immediately after engagement of third gear.

The invention claimed is:

1. A method of carrying out a shift of gears of an automatic transmission of a motor vehicle when driving either with or without utilization of a clutch, the vehicle having a drive train with a drive motor, the automatic transmission having several fixed transmission ratios, an automatic shifting clutch being arranged between the drive motor and the automatic transmission, and a shift control device for controlling a change in a transmission ratio of the automatic transmission according to at least one of a driver input and an automatic gear selector device which performs the change in the transmission ratio of the automatic transmission, after a decision by a decision device, either with or without disengaging the clutch, the method comprising the steps of:

disengaging a starting gear, with the decision device, in the presence of certain basic conditions without disengaging the clutch;

reading data into the decision device about a size and a progression of a measure which closely correlates with a rotational speed of an output shaft of the automatic transmission; and determining, via the decision device, a shifting mode for engaging a target gear, either with or without disengaging the clutch, which depends at least on the data read into the decision device.

2. The method according to claim 1, further comprising the step of utilizing the decision device and the shift control device for shifting between fixed translation ratios in the automatic transmission with at least primarily form-locking elements.

3. The method according to claim 1, further comprising the steps of disengaging the starting gear, without disengaging the clutch, with the decision device when the decision device detects certain basic conditions, subsequently monitoring with the decision devise whether the disengagement of the starting gear occurs within a default time and, if the default time is exceeded without disengagement of the starting gear, the decision devise causing a change in the shifting mode to a shift with disengagement of the clutch.

4. The method according to claim 1, further comprising the step of beginning operation of the shift control device, at a time before arrival of a decision concerning the shifting mode to activate an actuator of the clutch in a disengaging direction, and the shift control device carrying out activation before a decision is made about the shifting mode, only to the extent that no slippage of the clutch is involved.

5. The method according to claim 4, further comprising the step of controlling, with the shift control device, a speed of movement of the clutch actuators depending on an amount of load reduction.

6. The method according to claim 4, further comprising the step of controlling an actuation position of the clutch, with the starting gear disengaged and a target gear not yet engaged, depending on at least one of a sign and an absolute value of a difference of a set rotational speed and an actual rotational speed of the transmission input shaft, a level of a rotational speed of transmission input in the target gear, a quotient of a gradient of a target rotational speed and a gradient of rotational speed of an output shaft of the internal combustion engine and a driving resistance.

* * * * *